United States Patent [19]

Jeyendran

[11] Patent Number: 5,575,914
[45] Date of Patent: Nov. 19, 1996

[54] SPERM FILTER TRAP HAVING COMPRESSED GLASS WOOL FILTER MATERIAL

[75] Inventor: Rajasingam S. Jeyendran, Wheaton, Ill.

[73] Assignee: Vance Products Incorporated, Spencer, India.

[21] Appl. No.: 363,710

[22] Filed: Dec. 23, 1994

[51] Int. Cl.⁶ .............................. B01D 35/30; B01D 39/20
[52] U.S. Cl. .......................... 210/445; 210/446; 210/451; 210/510.1; 422/101; 435/806; 436/906
[58] Field of Search ....................... 210/435, 446, 210/450, 455, 474, 497.01, 500.1, 500.26, 510.01, 451; 422/101; 436/177, 906; 435/2, 311, 806; 65/22

[56] References Cited

U.S. PATENT DOCUMENTS

| | | | |
|---|---|---|---|
| 2,271,829 | 2/1942 | Powers | 65/22 |
| 3,448,041 | 6/1969 | Swank | 210/446 |
| 3,593,854 | 7/1970 | Swank | 210/446 |
| 3,693,804 | 9/1972 | Grover | 210/446 |
| 3,909,363 | 9/1975 | Bucalo | 436/906 |
| 4,116,845 | 9/1978 | Swank | 210/446 |

FOREIGN PATENT DOCUMENTS

| | | | |
|---|---|---|---|
| 2614899 | 11/1988 | France | 435/311 |

Primary Examiner—Joseph W. Drodge
Attorney, Agent, or Firm—Richard J. Godlewski

[57] ABSTRACT

A filter trap (10) for removing spermatozoa of relatively lower viability from a fluid containing both higher and lower viability spermatozoa includes a conduit (14) which compresses silica glass wool (16) to a density adequate to prevent the passage therethrough of lower viability spermatozoa and undesired extraneous materials, while permitting the passage therethrough of higher viability spermatozoa. The conduit (14) is preferably formed by a nested, locking pair of tubes (18) and (20) having respective downstream ends (22) and (24) which compress the glass wool (16) between them. The invention is particularly advantageous over the prior art in that it assures fixing the density of the glass wool (16) at a useful value, thereby preventing inadequate separation or inadequate flow of the fluid, while avoiding the training costs previously encountered in setting the density of the glass wool manually.

23 Claims, 3 Drawing Sheets

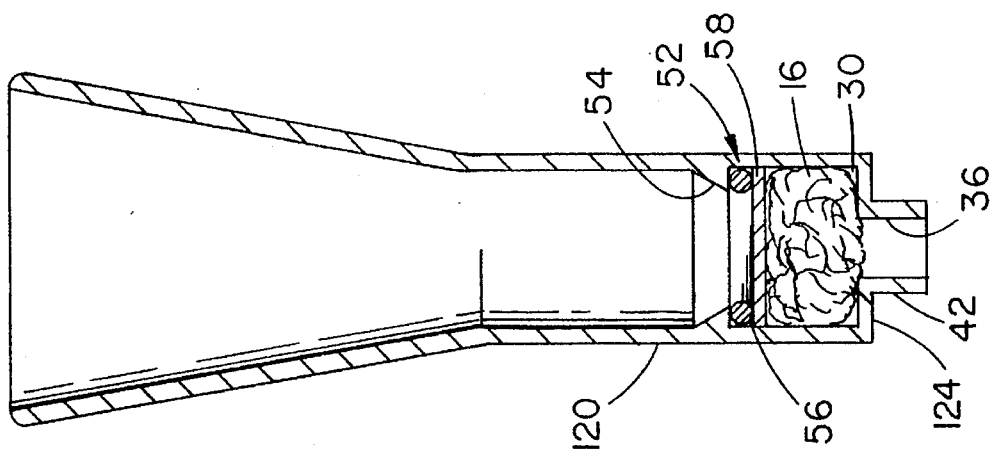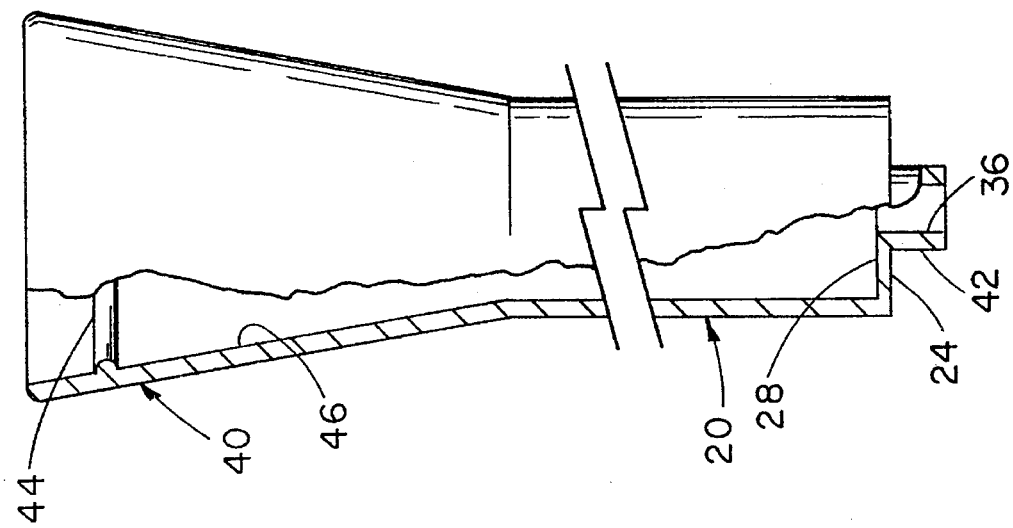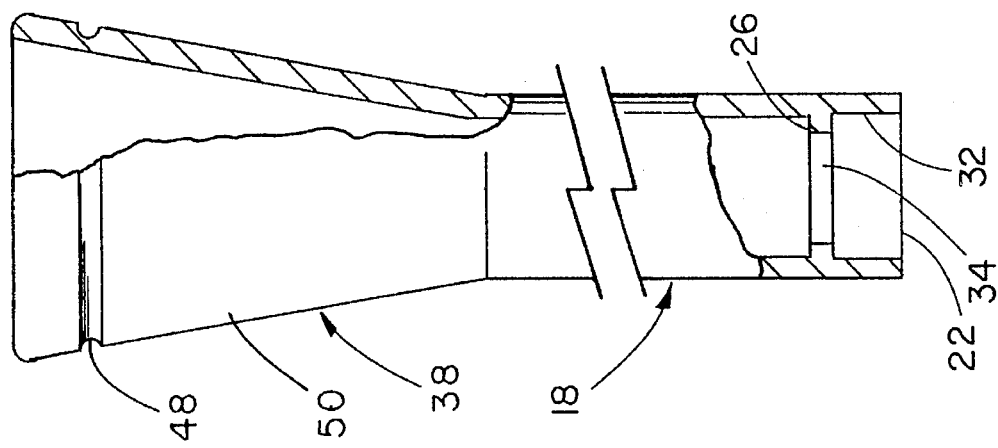

SPERM FILTER TRAP HAVING COMPRESSED GLASS WOOL FILTER MATERIAL

TECHNICAL FIELD

This invention relates generally to fertility, and more particularly to techniques of artificial insemination, in vitro fertilization, and the like.

BACKGROUND OF THE INVENTION

Conceiving and rearing children is one of the most pleasurable and rewarding aspects of life for many people. Unfortunately, numerous couples find themselves infertile with one another, unable to conceive without technological assistance. Such couples can be aided by a variety of technological methods such as artificial insemination (intracervical, intrauterine (IUI), intratubular and direct intraperitoneal (DIPI) insemination), gamete intrafallopian transfer (GIFT), in vitro fertilization and embryo transfer (IVFET), zygote intrafallopian transfer (such as ZIFT, PROST and TET), peritoneal oocyte and sperm transfer (POST), and sex selection, among others. However, these methods are generally costly, due to the high degree of training required of the medical participants, and the significant possibility of failure upon a single attempt at fertilization.

One source of the costs of these methods is the need to isolate higher viability spermatozoa, that is, spermatozoa having relatively higher motility and relatively more normal membranes, during the practice of these methods. Higher viability is believed to correlate to higher fertilizing capacity. Moreover, typical semen samples will contain materials which are known to interfere with the successful fertilization of an ovum, and with the successful maintenance of the fertilized ovum in the female patient. Such materials include paternal plasma, protein, leukocytes, spermdecapitation factors and other extraneous materials, and dead, agglutinated or nonviable spermatozoa (those spermatozoa having relatively low motility or possessing unhealthy, damaged or abnormal membranes, in particular,membranes which do not swell in hypotonic solutions). If not filtered from the spermatozoa-containing fluid used for fertilization, these materials can induce an adverse reaction in the female patient and result in spontaneous abortion of the fertilized ovum. For example, seminal plasma can cause severe uterine cramping (due to prostaglandins) when placed in the uterus during IUI. Similar problems are encountered with the artificial insemination of other mammals, e.g., bovines or equines, as well as other animals (e.g., turkeys). In short, higher viability spermatozoa appear more likely to yield successful fertilization and impregnation, and more likely to survive cryopreservation, and are therefore desirable in fertility techniques.

Numerous methods for separating higher viability spermatozoa from lower viability spermatozoa or other undesirable materials are known, and each has its advantages and drawbacks. For example, while the well-known swim up, swim down and Percoll density gradient centrifugation techniques obtain highly motile spermatozoa populations, the yields of these techniques is generally poor. This is particularly disadvantageous when the original ejaculates are oligozoospermic or asthenozoospermic.

Another example is given in U.S. Pat. No. 4,999,283 (Zavos et al.), which incidentally discloses the filtering of a spermatozoa-containing fluid through a "Sephadex" column as an adjunct to a filtering technique for separating male and female determining spermatozoa (column 6,lines 35 through 45). ("Sephadex" is believed to be a trademark for synthetic microscopic beads composed of crosslinked dextran.) The "Sephadex" is retained in the column (three disposable plastic syringes) by pads of glass wool, specifically, Johns-Manville (Denver, Colo.) MicroFiber, code 112, No. 475 glass. As disclosed at column 7, line 44 through column 8, line 18, the pads are prepared by taking thin sheets of 3 to 4 mg fiber and folding the long fibers under to make a circle about 1 cm in diameter, and the pads are then gently pushed into the bottom of the syringes (using a Pasteur pipet) until 1 to 2 mm protrudes through the holes in the syringes. The density of the glass wool, as indicated by flow rates, is adequate to prevent "Sephadex" from passing into the collection vials, yet not so much as to result in insufficient filtering. (More detail on the procedure for packing and using "Sephadex" columns can be found at page 71 of Graham et al., "An Overview of Column Separation of Spermatozoa," in Proc. 7th Tech. Conf. A.I. Reprod., NAAB, Madison, Wis., Apr. 14–15, 1978.) Clearly, the method contemplates that the successful discrimination between viable and nonviable sperm is achieved by the "Sephadex" beads, and not by the glass wool itself.

Glass wool has been found by itself, however, to be quite useful for separating higher viability spermatozoa from lower viability spermatozoa and other undesired materials. The present inventor has found good success with a modification of a method originally reported by Paulson and Polakoski (ibid, page 70, citing Fertil. Steril. 28:178–181 (1977)). As described in a continuing series of articles, beginning with Jeyendran et al., "Concentration of Viable Spermatozoa for Artificial Insemination," Fertil. Steril. 45(1):132–134 (1986), when the technique of glass wool filtration is standardized, it yields a higher recovery of viable spermatozoa than either the swim up or Percoll density gradient techniques, is significantly less time consuming and less costly in personnel training and equipment than either, and yields spermatozoa capable of penetrating a significantly higher percentage of denuded hamster oocytes (determined by the human sperm denuded hamster oocyte penetration (SPA) system) and of fertilizing a significantly higher percentage of intact human oocytes than either technique. The technique as standardized by Jeyendran employs 30 mg of glass wool microfiber manually positioned in the bottom of a 3 ml syringe barrel, carefully packed to a depth of 3 mm.

The Zavos et al. and Jeyendran techniques are subject to some drawbacks, however. In each, the density of the packed glass wool is critical to the success of the technique. Unfortunately, it takes significant time to train medical personnel to properly pack the glass wool in the filter columns, it takes significant time to perform the packing for numerous samples, and the personnel performing the packing must have a reasonable degree of familiarity with laboratory technique. These all add to the cost of performing the separation.

The problem of nonuniform density of the glass wool leads to other problems with each technique. In the technique of Zavos et al., the glass wool can either pass the "Sephadex" or fail to pass the sample, which in either case can require preparation of another sample, and at a minimum, a repeat of the filter preparation and filtration itself. In the technique of Jeyendran, even when preparation of the glass wool filter is standardized, the filter still allows a significant percentage (typically, on the order of 25 percent) of the lower viability spermatozoa to pass through. This may arise from two causes. First, it is likely that some lower viability spermatozoa are able to pass around the glass wool, that is between the glass wool and the inside of the filter assembly. Second, due to the resilient nature of the glass wool fibers, the volume of wool can change after the filter assembly is packed, thus decreasing the effective density of the glass wool and decreasing the efficacy of the filtration technique.

It should therefore be clear that it would be highly desirable to discover a technique or device which enjoys the successes of the Jeyendran technique and yet is easy and inexpensive to manufacture; and which simultaneously achieves the desired density of glass wool as employed in the Jeyendran technique and can handle fluid samples which are low in volume (important for enabling deep intracervical or intrauterine insemination), yet avoids the problems encountered with the variety of techniques described above.

SUMMARY OF THE INVENTION

The foregoing problems are solved and a technical advance is achieved in an illustrative sperm filter trap as disclosed herein. Applicant has discovered that these and other problems can be overcome by employing in his technique a filter trap which affirmatively establishes a fixed, predetermined and desired density for the glass wool. More particularly, Applicant achieves this end by employing a filter trap which includes a conduit which compresses the glass wool to the desired and useful density.

The present invention is thus directed to a filter trap for removing spermatozoa of lower viability from a fluid containing both higher and lower viability spermatozoa, comprising: a conduit for the flow of the spermatozoa-containing fluid therethrough; and glass wool in the conduit, through which the spermatozoa-containing fluid flows; wherein the conduit compresses the glass wool to a density adequate to impede movement of the lower viability spermatozoa while permitting movement of the higher viability spermatozoa through the glass wool. "Lower" and "higher" viability are relative terms readily understood by those skilled in the art as having a definite meaning, and encompass both differences in motility and differences in membrane quality. It is not known whether spermatozoa having abnormal membranes adhere to the glass wool, or simply do not move readily across it, but the particular mechanism of separation is not relevant to the fact of the highly successful separation achieved by the present invention.

In a particularly preferred embodiment of the present invention, the conduit comprises a nested pair of inner and outer tubes having adjacent but spaced downstream ends. The glass wool is located between and compressed between the downstream ends of the nested tubes. Also preferably, each of the downstream tube ends more particularly includes a transverse wall, and the glass wool is compressed between the transverse walls.

In order to prevent or minimize leakage of the spermatozoa-containing fluid directly between the glass wool and the nested tubes, the downstream end of the inner tube preferably bears on it an annular wall located circumferentially about the glass wool. Similarly, while the transverse walls of the tube ends are preferably perforate, their perforations do not extend all of the way diametrically across them, so as to prevent or minimize unwanted leakage.

Each of the nested tubes preferably includes a flared funnel end opposite its downstream end. These flared ends serve several purposes: they serve to direct the flow of the spermatozoa-containing fluid into and through the filter trap; they permit the filter trap to rest on a conventional test tube for collection of the higher viability spermatozoa which pass through the glass wool; and they can bear on them cooperating parts to lock the nested tubes together during use, thus preventing any change in the density of the glass wool during handling or filtering. Other advantageous features of the filter trap of the present invention are pointed out in regards to the detailed description of the invention set forth below.

The conduit is can be single use or multiple use, depending upon the material from which it is constructed. Preferably, the conduit is composed of a physiologically innocuous or inert material, such as a sterilizable plastic. It is desirable that the material have a slight degree of resiliency, adequate to allow locking of the nested tubes when employed as the conduit.

The glass wool is preferably composed of extruded silicate or borosilicate glass fibers. The literature suggests that lime glass fibers do not achieve an adequate separation of higher and lower viability spermatozoa; however, the use of lime glass or other fibers (although not preferred) would be expected to fall within the scope of the present invention. Optimally, however, the glass wool fibers are Johns-Manville (Denver, Colo.) MicroStrand glass microfiber Type 475, or equivalent.

The glass wool fibers are preferably 3 to 5 micrometers in diameter for use with human spermatozoa, nominally 4 micrometers in diameter. It is unnecessary to incorporate binders or sizing on or in the glass wool fibers in the practice of the present invention, although these can be employed if desired. The use of larger fibers will increase the density of the glass wool and thus increase the filter time, so care should be taken to match the fiber diameter to the spermatozoa size of the species under consideration, and the unwanted effects of too long a filter time. For example, the present invention is expected to be useful with nonhuman spermatozoa such as bovine (bull), but a different compression by the conduit (and thus a different glass wool density) would be required because bovine spermatozoa is not the same size as human spermatozoa.

Use of the sperm filter trap of the present invention is straightforward. A spermatozoa-containing fluid is prepared in any conventional fashion, while the glass wool is inserted into and compressed by the conduit, for example, by trapping the glass wool between the transverse walls of the downstream end of the nested tubes. The glass wool is preferably rinsed with an appropriate fluid or medium to remove any short glass fiber fragments which may be incidentally contained in the glass wool. The trap then is positioned vertically over a suitable collector, such as a conventional test tube. The spermatozoa-containing fluid is then introduced into the conduit and allowed to flow by gravity through the glass wool. Additional compatible medium is supplied as required, and the higher viability spermatozoa pass through the filter trap by gravity and are deposited in the collector, from where they are recovered for their ultimate use in any of the fertility methods described above.

BRIEF DESCRIPTION OF THE DRAWING

A better understanding of the present invention will now be had upon reference to the following detailed description, in conjunction with the accompanying drawing, wherein like reference characters refer to like parts throughout the several views, and in which:

FIG. 2 is a cross-sectional view of a portion of the preferred embodiment of the present invention;

FIG. 3 is a cross-sectional view of another portion of the preferred embodiment of the present invention;

FIG. 5 is a cross-sectional view of a portion of another preferred embodiment of the present invention, similar to FIG. 4.

Figure 1:
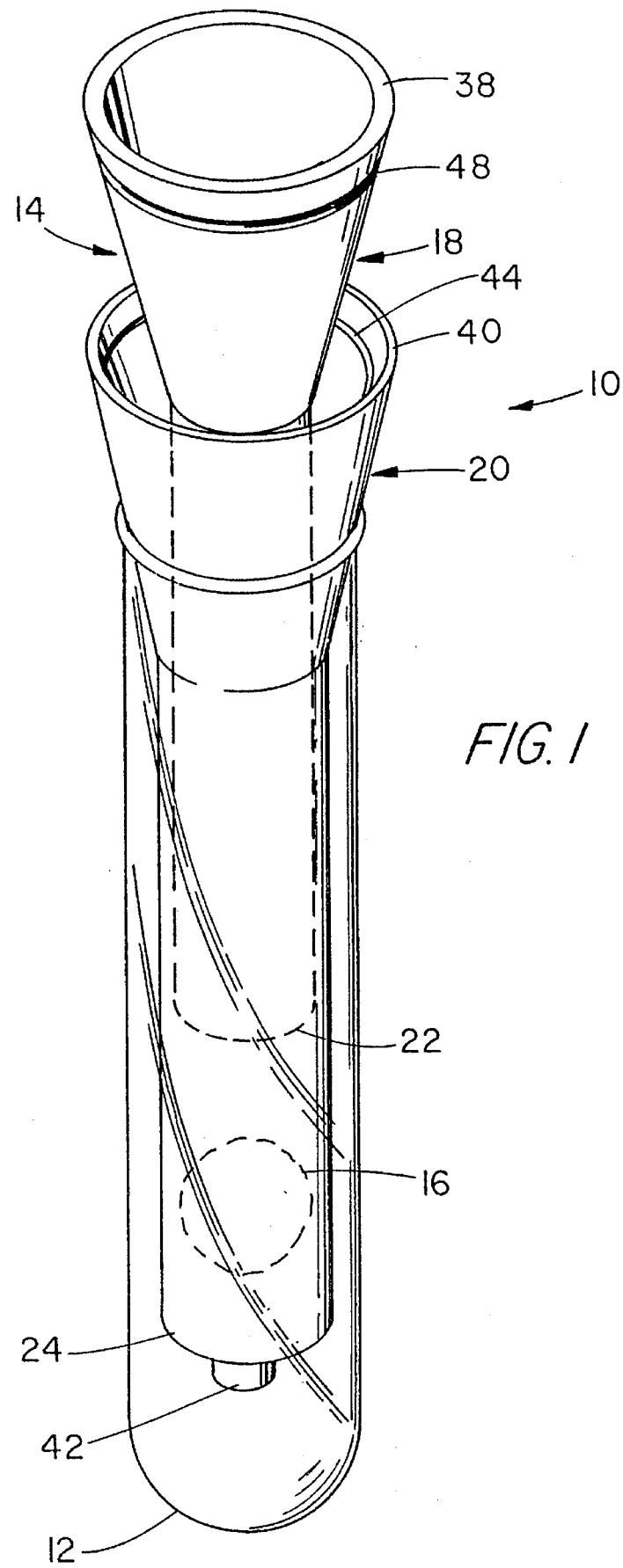
FIG. 1 is an exploded view of the preferred embodiment of the present invention.
Figure 4:
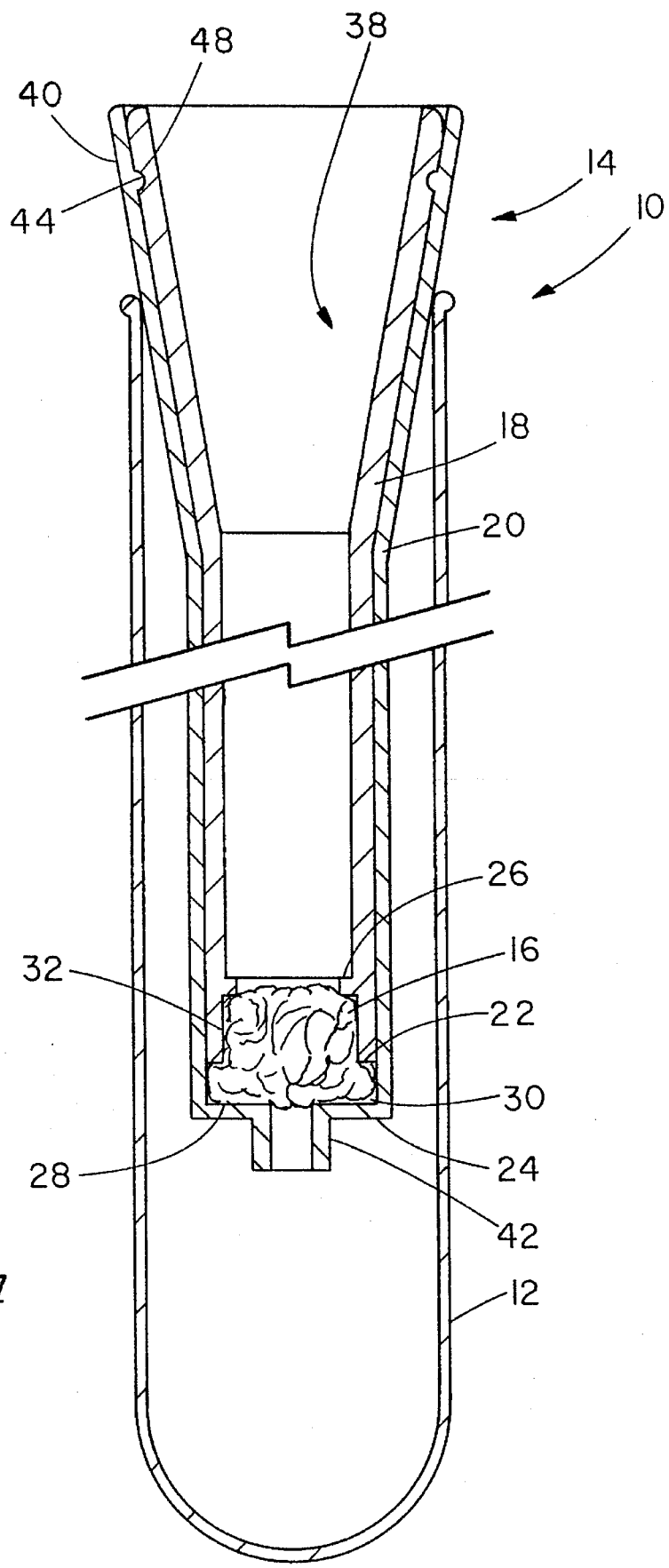
FIG. 4 is a cross-sectional view of the preferred embodiment of the present invention, fully assembled for use.

It should be noted that the cross-sectional views of FIGS. 2 through 4 are drawn to scale, with some dimensions indicated below, and other dimensions evident from an inspection of the figures.

DETAILED DESCRIPTION

With reference first to FIGS. 1 through 4, the preferred embodiment of a sperm filter trap 10 according to the present invention is thereshown in conjunction with a collection device such as a conventional 13 by 100 mm test tube 12. The filter trap 10 comprises a conduit 14 for the flow of a spermatozoa-containing fluid therethrough, and a measured amount of glass wool 16 in the conduit, through which the spermatozoa-containing fluid flows. The conduit 14 compresses the glass wool 16 to a density adequate to impede movement of lower viability spermatozoa while permitting movement of higher viability spermatozoa through the glass wool 16. The glass wool is preferably Johns-Manville (Denver, Colo.) MicroStrand glass microfiber type 475, a borosilicate glass of nominal 4 micrometers diameter, generally ranging between 3 and 5 micrometers in diameter. The type 475 microfibers are binder and sizing free, and have the approximate composition (percent by weight): 58.3% $SiO_2$, 5.8% $Al_2O_3$, 11.3% $B_2O_3$, 10.1% $Na_2O$, 2.9% $K_2O$, 1.8% CaO, 0.3% MgO, 5% BaO and 4% ZnO. For separating human spermatozoa, the conduit 14 compresses the glass wool 16 to a density in the range of 0.05 to 0.11 $mg/mm^3$, preferably about 0.07 $mg/mm^3$. Those skilled in the art will readily be able to adjust this density to spermatozoa of other species.

The conduit 14 preferably comprises a nested inner tube 18 and an outer tube 20. The tubes 18 and 20 are preferably circular in cross section, although any other convenient shape can be employed. The inner tube 18 possesses a downstream end 22 which faces a downstream end 24 of the outer tube 20. The glass wool 16 is positioned between and compressed between the downstream tube ends 22 and 24. More particularly, the inner tube 18 includes a transverse wall 26 extending across the downstream tube end 22, while the outer wall 20 includes a transverse wall 28 extending across the downstream tube end 24. The transverse walls 26 and 28 define between them a space 30 in which the glass wool 16 is positioned, so that the walls 26 and 28 compress the glass wool 16 to a defined density. In the particular configuration shown in FIGS. 3 and 4, the inside diameter of the outer tube is about 0.341 inches, or about 8.7 mm.

The downstream end 22 of the inner tube 18 bears on it, preferably along the outer edge or periphery of the transverse wall 26, an annular wall 32 extending circumferentially about all or preferably part of the glass wool 16, and extending from the downstream end 22 of the inner tube 18 towards the downstream end 24 of the outer tube 20. In the particular configuration shown in FIGS. 2 and 4, a clearance of about 0.118 inches, or about 3.0 mm, is provided from the annular wall 32 to the outer tube transverse wall 28. This makes the volume of the space 30, in which the glass wool 16 is compressed, about 0.18 cc. The annular wall 32 serves the particular function of directing the spermatozoa-containing fluid onto the glass wool 16, thereby preventing lower viability spermatozoa and other undesired materials from slipping between the glass wool 16 and the conduit 14.

Each of the transverse walls 26 and 28 have at least one perforation 34 and 36, respectively, formed through them. Preferably, the perforations 34 and 36 do not extend all of the way across the diameters of their respective transverse walls 26 and 28; otherwise, they may prevent proper compression of the glass wool 16, and may permit leakage of the spermatozoa-containing fluid between the glass wool 16 and the nested tubes 18 and 20. The perforation 34 of the inner tube transverse wall 26 is preferably located within the annular wall 32.

The inner tube 18 possesses a ten degree flared funnel end 38 opposite its downstream end 22, while the outer tube 20 preferably similarly possesses a ten degree flared funnel end 40 opposite its downstream end 24. The nested tubes 18 and 20 are locked together, preferably in a detachable fashion, by an annular bead 44 on the inner surface 46 of the funnel end 40 of the outer tube 20, and a cooperating annular recess 48 on the inner surface 50 of the funnel end 38 of the inner tube 18. When the bead 44 is engaged in the recess 48, the tubes 18 and 20 are locked together, thereby fixing the position of their transverse walls 26 and 28 with respect to one another. Since the transverse walls 26 and 28 compress the glass wool 16 between them, engagement of the bead 44 in the recess 48 also fixes the density of the glass wool 16 and prevents that density from changing during handling or use of the filter trap 10. The diameters of the inner and outer tubes are preferably selected to fit snugly together to fixedly space the downstream ends of the inner and outer tubes, thereby independently fixing the density of the glass wool therebetween.

Such locking prevents or substantially reduces the likelihood of leakage of the spermatozoa-containing fluid between the conduit 14 and the glass wool 16. Leakage is further prevented or reduced by the annular wall 32 on the downstream end 22 of the inner tube 18, since the wall 32 at least partly surrounds the glass wool 16. In order to further direct the proper flow of the fluid into the test tube 12 or other collector, the transverse wall 28 of the outer tube 20 includes an outwardly extending tip 42 positioned about the perforation 36. The tip 42 facilitates drop formation, thereby encouraging fluid exit from the filter trap 10.

Of course, gravity may alternatively provide the fixing of the inner and outer tubes 18 and 20. In such a case, the funnel end 40 of the outer tube 20 can be omitted, and the outer tube 20 shaped as a hollow cylinder with its downstream end 24 partly closed. The funnel end 38 of the inner tube 18 could then rest on the open end of the outer tube 20. A flange (not shown) on the outer surface of the outer tube 20 would allow the trap 10 to rest on the lip of the test tube 12, while the weight of the inner tube 18 compresses the glass wool 16 to the desired density.

With particular reference to FIG. 5, another preferred embodiment of the present invention is thereshown, in which the conduit 14 comprises a disparate element 52 different from, but serving a purpose similar to that of, the inner tube 18. More particularly, a modified tube 120 (similar to the outer tube 20) includes a retaining flange 54 on its inner surface, spaced from a downstream tube end 124. The element 52 comprises a resilient O-ring 56 abutting the flange 54, and a physiologically innocuous or inert mesh or screen 58 positioned between the O-ring 56 and the downstream end 124 of the tube 120. The screen 58 can be composed of a physiologically acceptable plastic, or a metal such as silver, although the screen 58 is preferably and conveniently composed of fiberglass. The screen 58 and the downstream tube end 124 define between them the space 30 for containing and compressing the glass wool 16 to an appropriate and predetermined volume. The element 52 and the flange 54 also cooperate to form a seal between the tube 120 and the glass wool 16, preventing or limiting the flow of spermatozoa-containing fluid between them.

Use of the sperm filter trap 10 of the present invention can now be easily understood. The trap 10 is assembled by gently inserting 12.5 mg of the type 475 glass wool 16 into the downstream end 24 of the outer tube 20, and inserting the inner tube 18 into the outer tube 20 until the bead 44 on the outer tube 20 is firmly seated in the recess 48 of the inner tube 18, so that the tubes 18 and 20 are locked together, compressing the glass wool 16 to a fixed and predetermined density. In the particular configuration shown in FIGS. 2 through 4, the space 30 (defined by the downstream ends 22 and 24 of the tubes 18 and 20) containing the glass wool 16 has a volume of about 0.18 cc. The nested and locked tubes 18 and 20 are then held vertically, and the glass wool 16 washed several times with 3 ml portions of a suitable fluid or medium, such as a sperm extender in which sperm viability is well maintained (for example, Hamms F10, BWW, tyrode solution, or the like), until microscopic examination reveals that the filtrate is free of wool fibers. This means that the glass wool 16 in the conduit 14 is free (at least, relatively free) of short, loose glass fibers which might damage the spermatozoa filtered through it. The trap 10 is then placed on a 13 by 100 mm test tube for collection of higher viability sperm, the funnel end 40 of the outer tube 20 resting on the lip of the test tube 12.

The spermatozoa-containing fluid is then obtained or prepared. For example, fresh ejaculate can be used as the fluid without any pretreatment if it is first allowed to fully liquefy. As with other filtration processes, the viscosity of the sample or fluid can be diminished dilution, potentially avoiding the need for washing and/or concentration. It is preferred, however, that at least some minimal steps be taken to reduce the amount of undesired material in the ejaculate or other semen sample prior to filtration with the filter trap 10.

Any convenient technique for washing, concentrating and/or diluting the ejaculate can be employed. Optimally, however, the spermatozoa-containing fluid is a semen sample which has been washed and concentrated as follows: An ejaculate sample is first allowed to liquefy completely, about at least 15 minutes after ejaculation for human semen. The volume, concentration, count and motility of the ejaculate are determined. The sample is then diluted 1:5 (v/v) with a suitable medium as described above. The resulting fluid is centrifuged a first time at 300 to 500 g for 5 to 10 minutes. The supernatant is discarded and the pellet (containing the spermatozoa in the sample) is resuspended in 1 ml of medium. Centrifugation, for the same time and gravity, is repeated. The supernatant is again discarded, and the pellet is resuspended in 0.5 ml of medium. (If a high concentration of leukocytes is present, it is preferable to sediment them out of the fluid at this point by centrifugation at 300 to 500 g for 15 to 20 sec.) The resulting spermatozoa-containing fluid, thus washed and concentrated, is ready for filtration with the trap 10 of the present invention.

Filtration of the spermatozoa-containing fluid is carried out by gently introducing the fluid into the inner tube 18 of the trap 10, preferably over the perforation 34 in the transverse wall 22 of the inner tube 18, and on to the glass wool 16. The introduction is conveniently performed by pipetting. The fluid is then allowed to pass through the trap 10 and out the tip 42 by gravity, into the test tube 12. The first three to five drops of filtrate can be discarded or refiltered, since these will generally contain only the medium, or will contain few spermatozoa. Filtration time will typically be on the order of two to two and one-half (2 to 2½) minutes, depending upon the viscosity of the fluid, and the amount of undesirable materials in it. If filtration times of more than five minutes are experienced, centrifugation should be repeated. The recovered higher viability spermatozoa are thus made available for further use in any of the conventional fertility methods described earlier.

The amount of glass wool 16 employed in the trap 10 of FIGS. 1 through 4 is capable of filtering only no more than about $200 \times 10^6$ spermatozoa in a reasonable period of time. If the spermatozoa-containing fluid contains more than $200 \times 10^6$ spermatozoa, the fluid should be divided and diluted, and more than one quantity of glass wool 16 or more than one trap 10 used.

The present invention thus provides a sperm filter trap useful for removing lower viability spermatozoa and other undesired materials from a fluid containing a mixture of lower and higher viability spermatozoa, allowing the higher viability spermatozoa to be recovered for use in a variety of fertility methods. The resulting filtrate contains all or almost all of the fertile spermatozoa in the fluid, and has no or almost no seminal plasma, sperm decapitation factors, nonviable, poorly fertile and infertile sperm, and nonsperm cellular elements (such as leukocytes) which can interfere with fertilization. The recovered spermatozoa are motile and have functionally active and physically intact membranes. The filtrate can be low in volume, so as to enable methods such as deep intracervical or intrauterine insemination. The sample or fluid can be processed with the filter trap of the present invention more easily and reliably than when earlier methods are used, yet the present filter trap allows samples and fluids to be processed in a relatively short period of time, on the order of 30 minutes. The present invention achieves these objects by completely or almost completely preventing leakage of undesired materials around the glass wool and simultaneously ensuring that the density of the glass wool is maintained at a fixed and predetermined value.

INDUSTRIAL APPLICABILITY

The above-described sperm filter trap is useful in improving human and animal fertility, and thus finds applicability in the fields of human medicine, veterinary medicine and animal husbandry.

It is to be understood that the above-described sperm filter trap is merely an illustrative embodiment of the principles of this invention, and that other sperm filter traps may be devised by those skilled in the art without departing from the spirit and scope of the invention. It is also to be understood that the invention contemplates embodiments both comprising and consisting of the disclosed elements.

What is claimed is:

1. A filter trap operable (10) for removing spermatozoa of lower viability from a fluid containing both higher and lower viability spermatozoa, comprising:

a conduit (14) arranged for the flow of the spermatozoa-containing fluid therethrough; and glass wool (16) in the conduit (14), through which the spermatozoa-containing fluid flows;

wherein the conduit (14) comprises structure arranged for compressing the glass wool (16) both in the direction of and in another direction transverse to the flow of the spermatozoa-containing fluid through the conduit (14), to a density adequate to substantially impede movement of the lower viability spermatozoa through the glass wool (16), while substantially permitting movement of the higher viability spermatozoa through the glass wool (16);

wherein the glass wool (16) is capable of substantially impeding the movement of the lower viability spermatozoa but substantially permitting the movement of the higher viability spermatozoa; and wherein the compression of the glass wool (16) provided by the structure (14) fixes the density of the glass wool (16) and prevents the density of the glass wool (16) from changing during handling and use of the filter trap (10).

2. The filter trap according to claim 1, wherein the conduit (14) comprises nested inner and outer tubes (18, 20) having adjacent but spaced downstream ends (22, 24), and wherein the glass wool (16) is located between and compressed by the inner and outer tube downstream ends (22, 24).

3. The filter trap according to claim 2, wherein at least one of the inner and outer tubes (18, 20) includes a flared funnel end (38, 40) opposite its downstream end (22, 24).

4. The filter trap according to claim 2, wherein each of the inner and outer tube downstream ends (22, 24) includes a transverse wall (26, 28), and the transverse walls (26, 28) of the inner and outer tube downstream ends (22, 24) compress the glass wool (16) between them.

5. The filter trap according to claim 4, wherein the transverse walls (26, 28) of the inner and outer tube downstream ends (22, 24) both include at least one associated perforation (34, 36) therethrough extending less than fully diametrically across its associated transverse wall (26, 28).

6. The filter trap according to claim 4, wherein the transverse wall (28) of the outer tube (20) includes an extended tip (42) as an outlet for the spermatozoa containing fluid and the higher viability spermatozoa passing through the glass wool (16).

7. The filter trap according to claim 2, wherein both of the inner and outer tubes (18, 20) include an associated abuttable portion (38, 40), and wherein abutment of the abuttable portions (38, 40) fixes the spacing of the downstream ends (22, 24) of the inner and outer tubes (18, 20) with respect to one another, thereby compressing the glass wool (16) to the adequate density.

8. The filter trap according to claim 1, wherein the glass wool (16) comprises silicate or boresilicate glass.

9. The filter trap according to claim 1, wherein the glass wool (16) possesses the spermatozoa-filtering characteristics of Johns-Manville (Denver, Colo.) MicroStrand glass microfiber type 475.

10. The filter trap according to claim 1, wherein the density of the compressed glass wool (16) is about 0.05 to 0.11 mg/mm$^3$.

11. The filter trap according to claim 10, wherein the glass wool (16) comprises fibers generally ranging between 3 and 5 micrometers in diameter.

12. The filter trap according to claim 1, having about 12.5 mg of the glass wool (16).

13. The filter trap according to claim 1, wherein the conduit (14) comprises a sterilizable and physiologically inert plastic.

14. The filter trap according to claim 1, wherein the conduit (14) comprises glass.

15. The filter trap according to claim 1, wherein the glass wool (16) is relatively free of loose glass fibers.

16. The filter trap according to claim 1, wherein the conduit (14) includes a tube (20 or 120) and an element (18 or 52) compressing the glass wool (16) between them to the adequate density.

17. The filter trap according to claim 1, wherein the conduit (14) includes at least one tube (20 or 120) in which the glass wool (16) is contained, and a seal (52 and 54) between the glass wool (16) and the at least one tube (20 or 120) to minimize or avoid leakage of the spermatozoa-containing fluid directly between the glass wool (16) and the tube (20 or 120).

18. The filter trap according to claim 1, wherein the glass wool (16) comprises fibers generally ranging between 3 and 5 micrometers in diameter.

19. A filter trap operable (10) for removing spermatozoa of lower viability from a fluid containing both higher and lower viability spermatozoa, comprising:

a conduit (14) for the flow of the spermatozoa-containing fluid therethrough; and glass wool (16) in the conduit (14), through which the spermatozoa-containing fluid flows;

wherein the conduit (14) compresses the glass wool (16) to a density adequate to substantially impede movement of the lower viability spermatozoa while substantially permitting movement of the higher viability spermatozoa through the glass wool (16);

wherein the conduit (14) comprises nested inner and outer tubes (18, 20) having adjacent but spaced downstream ends 122,24), and wherein the glass wool (16) is located between the inner and outer tube downstream ends (22, 24);

wherein each of the inner and outer tube downstream ends (22, 24) includes a transverse wall (26, 28), and the transverse walls (26, 28) of the inner and outer tube downstream ends (22, 24) compress the glass wool (16) between them; and wherein the transverse wall (26) of the inner tube (18) bears on it an annular wall (32), the annular wall (32) extending circumferentially around the glass wool (16).

20. The filter trap according to claim 19, wherein the transverse walls (26, 28) of the inner and outer tube downstream ends (22, 24) both include at least one associated perforation (34, 36) therethrough extending less than fully diametrically across its associated transverse wall (26, 28).

21. The filter trap according to claim 20, wherein the annular wall (32) of the inner tube downstream end (22) is positioned about the at least one perforation (34) in the inner tube downstream end transverse wall (26).

22. The filter trap according to claim 19, wherein the transverse walls (26, 28) of the inner and outer tube downstream ends (22, 24), and the annular wall (32) of the inner tube downstream end (22), define a space (30) having a volume of about 0.18 cc for containment of the glass wool (16) between them.

23. A filter trap operable (10) for separating spermatozoa of lower viability from a fluid containing both higher and lower viability spermatozoa, comprising:

a conduit (14) for the flow of the spermatozoa-containing fluid therethrough; and about 12.5 mg of glass wool (16) in the conduit (14), through which the spermatozoa-containing fluid flows;

wherein the conduit (14) compresses the glass wool (16) to a density adequate to substantially impede movement of the lower viability spermatozoa while substantially permitting movement of the higher viability spermatozoa through the glass wool (16);

wherein the conduit (14) comprises nested inner and outer tubes (18, 20) having adjacent but spaced downstream ends (22, 24), and wherein the glass wool (16) is located between the inner and outer tube downstream ends (22, 24);

wherein each of the inner and outer tube downstream ends (22, 24) includes a transverse wall (26, 28), and the transverse walls (26, 28) of the inner and outer tube downstream ends (22, 24) compress the glass wool (16) between them;

wherein at least one of the inner and outer tubes (18, 20) includes a flared funnel end (38, 40) opposite its downstream end (22, 24);

wherein the transverse wall (26) of the inner tube (18) bears on it an annular wall (32), the annular wall (32) extending circumferentially around the glass wool (16);

wherein the transverse walls (26, 28) of the inner and outer tube downstream ends (22, 24) both include at least one associated perforation (34, 36) therethrough extending less than fully diametrically across its associated transverse wall (26, 28);

wherein the annular wall (32) of the inner tube downstream end (22) is positioned about the at least one perforation (34) in the inner tube downstream end transverse wall (26);

wherein the glass wool (16) possesses the spermatozoa-filtering characteristics of Johns-Manville (Denver, Colo.) MicroStrand glass microfiber type 475;

wherein the density of the compressed glass wool (16) is about 0.05 to 0.11 mg/mm$^3$;

wherein the glass wool (16) is relatively free of loose glass fibers; and wherein the transverse wall (28) of the outer tube (20) includes an extended tip (42) as an outlet for the spermatozoa-containing fluid and the higher viability spermatozoa passing through the glass wool (16).

* * * * *